Aug. 22, 1967     R. A. O'CONNELL     3,336,694
AIR CURTAIN TYPE INSECT TRAP
Filed Jan. 3, 1966
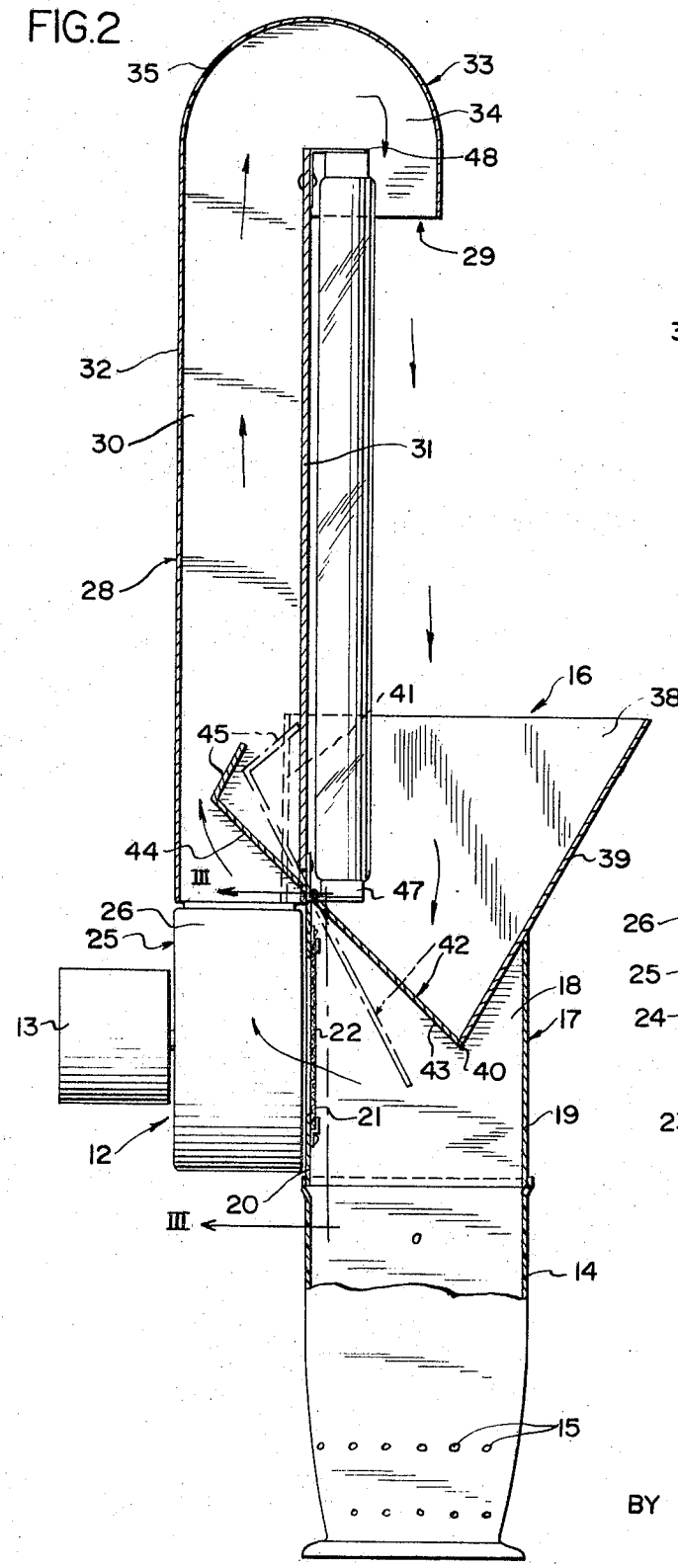
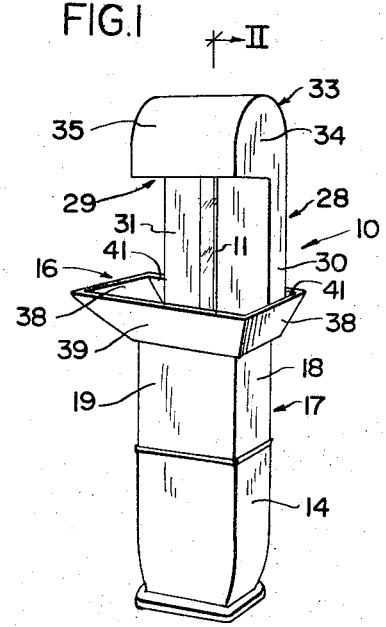
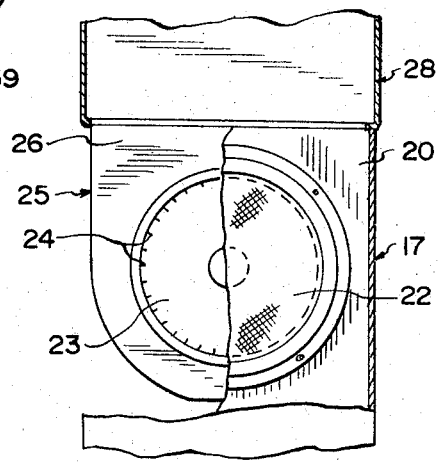
INVENTOR
ROBERT A. O'CONNELL
BY *Alberti, Bregina & Lund*
ATTORNEYS

United States Patent Office 3,336,694
Patented Aug. 22, 1967

3,336,694
AIR CURTAIN TYPE INSECT TRAP
Robert A. O'Connell, Albuquerque, N. Mex., assignor to I.M.S. Corporation, Albuquerque, N. Mex., a corporation of New Mexico
Filed Jan. 3, 1966, Ser. No. 518,294
10 Claims. (Cl. 43—139)

This invention relates to an insect trap, and more particularly to an insect trap wherein insects are attracted by an ultraviolet light source and smoothly and efficiently directed into collection means, the trap being readily and economically constructed while being rugged and durable and being readily cleaned.

Insect traps have heretofore been provided using an ultraviolet light source to attract insects, and using a suction fan having an intake adjacent to the lamp and an exhaust to discharge the insects into collection means. Such traps have been successfully used, but have presented difficulties in that insects have impinged on the fan blades to produce a difficult cleaning problem. Also the traps have not been highly efficient because it is found that a certain percentage of the insects are repelled away by air turbulence created by the fan.

This invention was evolved with the general object of overcoming the disadvantages of prior art insect traps and providing an insect trap which is smooth and efficient in operation, while being readily cleaned and easily and economically constructed, rugged and durable.

According to this invention, an insect trap is provided including an ultraviolet lamp adjacent to an inlet of air passage means having a blower therein, with collection means communicating with the air passage means between the inlet thereof and the blower to receive insects. With this arrangement, the insects are propelled into the collection means ahead of the blower, and do not impinge on blades of the blower, so as to avoid the cleaning difficulties of prior devices. Further, since the insects do not reach the blower, it is possible to use a blower of the centrifugal type, not usable in prior arrangements due to cleaning difficulties.

A very important feature of the invention is in the location of the inlet and the outlet of the air passage means in facing relation to create an air curtain adjacent to the lamp. With this arrangement, a much higher velocity air flow can be created for directing the insects into the collection means, while avoiding the turbulence produced with prior art constructions. By creating the air curtain, the insects flying toward the lamp encounter substantially no air currents until they are quite close to the lamp, when they are subjected to the relatively high velocity of the flow in the air curtain to be smoothly and efficiently propelled into the collection means.

Preferably, the lamp is in the form of an elongated fluorescent tube disposed with its longitudinal axis in generally parallel relation to the direction of air flow in the curtain, and in accordance with a further important feature, the air passage means includes a conduit having a generally straight portion extending from the blower in parallel relation to the lamp and to the air curtain, and a generally U-shaped portion extending from the straight portion to the outlet of the air passage means.

Another feature of the invention is in the provision of a generally vertical conduit portion extending upwardly from the upper end of container means to the inlet of the air passage means. Preferably, the blower is supported on a side wall of the conduit portion with an intake thereof adjacent a side wall opening in the conduit portion, with a screen across the opening.

According to a specific feature of the invention, flared wall means are provided at the upper end of the conduit portion to define a mouth converging from the inlet to a throat of reduced cross-sectional area. Preferably, the lower end of the fluorescent tube extends downwardly into the converging mouth. This is found to be highly advantageous because insects have a habit of flying in a circular motion within about forty-five degrees of a vertical plane toward the bottom of the vertically disposed fluorescent light tube, and with this arrangement the insects are attracted deep into the mouth where the air velocity is near its peak value, so as to increase the efficiency of the trap.

Still another feature of the invention is in the provision of pivotal vane means in the conduit portion urged to a closed position to prevent escape of insects and movable to an open position by air flow induced by the blower.

This invention contemplates other and more specific objects, features, and advantages which will become more fully apparent from the following detailed description taken in conjunction with the accompanying drawings which illustrate a preferred embodiment and in which:

FIGURE 1 is a perspective view of an insect trap constructed in accordance with the principles of this invention;

FIGURE 2 is an elevational section view taken substantially along line II—II of FIGURE 1; and FIGURE 3 is a sectional view taken substantially along line III—III of FIGURE 2.

Reference numeral 10 generally designates an insect trap constructed in accordance with the principles of this invention. In general, the trap 10 comprises an ultraviolet light source 11, preferably a fluorescent lamp in the form of an elongated tube extending vertically, and arranged to radiate light in the near ultraviolet spectrum to attract insects thereto. Preferably, the spectrum of radiation of the lamp does not extend into the visible spectrum, but it will be understood that it may do so, so long as the spectrum includes that attractive to insects. Ultraviolet light will attract almost all night-time and flying insects, but generally does not attract butterflies or other unobjectionable or beneficial insects.

A blower 12, operated by an electric motor 13, operates to produce an air flow such that insects are propelled downwardly into collection means in the form of a container 14, having a closed bottom and an open top. Container 14 may desirably be of a plastic material, and openings 15 may be provided in the lower portion thereof, of a size large enough to permit moisture to drain from the container 14, but small enough to prevent escape of insects.

The container 14 effectively communicates with a portion of an air passage which extends between an inlet, generally designated by reference numeral 16, and the intake of the blower 12. To define the air passage, a generally vertical conduit portion 17 is provided, extending upwardly from the upper, open end of the container 14, the conduit portion 17 being preferably formed of said walls 18 and front and rear walls 19 and 20 of sheet metal. The rear wall 20 is provided with a generally circular opening 21, which communicates with the intake of the blower 12, and when is preferably covered with a screen 22 to prevent entry of insects into the blower 12. It will be noted that there is a reverse turn in the air flow path, in that it flows downwardly toward the container 14 and then back upwardly to reach the blower intake.

The blower 12 is preferably of a centrifugal type, including a rotor 23 which is driven directly from the shaft of motor 13, and which carries a plurality of peripherally-spaced axially extending blades or vanes 24 which have outer edges spaced radially outwardly from inner edges thereof, operative to induce flow of air radially outwardly, and also circumferentially in the direction of rotation of the rotor 23. A conventional housing 25 is provided, including an exhaust portion 26 positioned to direct flow of air upwardly.

In accordance with an important feature of the invention, conduit means generally designated by reference numeral 28 are provided, extending from the exhaust of the blower 12 to an outlet 29 in facing relation to the inlet 16, to create an air curtain adjacent the lamp 11 and between the outlet 29 and the inlet 16, and to thereby produce a relatively high velocity flow of air to propel insects into container 14, without, however, creating substantial air turbulence at points spaced a substantial distance from the trap. Thus, insects flying toward the lamp 11, are not affected by air flow until they reach a point relatively close thereto, at which time they are carried by a relatively high velocity air stress into the container 14.

The conduit means 28 comprises a generally straight portion extending upwardly from the blower exhaust portion 26 in parallel relation to lamp 11, the straight portion being defined by side walls 30 and front and rear walls 31 and 32, preferably of sheet metal.

The conduit means 28 further includes a generally inverted U-shaped portion 33, defined by semi-circular wall portions 34 formed as integral co-planar extensions of the side walls 30, and a wall 35 extending arcuately in a half circle from and end integral with the upper end of the rear wall 32 to an end 36 spaced forwardly from the front wall 31.

A further feature of the invention is in the provision of flared wall means at the upper end of the conduit portion 17 defining a mouth converging from the inlet 16 to a throat of reduced cross-sectional area. The flared wall means includes a pair of side walls 38 extending angularly outwardly and upwardly from the upper ends of the side walls 18 on the conduit portion 17, and a front wall 39 extending angularly outwardly and upwardly from the upper edge of the front wall 19, and also extending angularly inwardly and downwardly to an edge 40. A pair of rear wall portions 41 are provided extending inwardly from rearward edges of the side walls 38 to the side walls 30 of the conduit means 28.

To further define the converging mouth structure, and also to prevent escape of insects when the blower 12 is not operating, a vane 42 is supported for pivotal movement upon a horizontal axis between the upper edge of the rear wall 20 of conduit portion 17 and the lower edge 31 of the conduit means 28. With the motor 13 de-energized and the blower 12 inoperative, a portion 43 of the vane 42 extends from the axis of pivotal movement downwardly and inwardly to a lower edge portion engaged with the lower edge 40 of the wall 39, while another portion 44 of the vane 42 extends upwardly and rearwardly from the axis of pivotal movement into the conduit means 28. When the motor 13 is energized to activate the blower 12, a stream of air is impinged on the lower surface of the portion 44 and another stream of air is impinged on the upper surface of the portion 43 to pivot the vane 42 to a position as illustrated in broken lines in FIGURE 2, at which time a forwardly bent end portion 45 at the upper end of the portion 44 engages the front wall 31 of the conduit means 28.

It will be noted that in the operative position of the vane 42, a throat is formed between the lower edge part of the portion 43 and the lower edge 40 from the wall 39 which has a cross-sectional area which is a small fraction of the cross-area of the inlet 16.

The lamp 11 is supported on the wall 31 by suitable lower and upper end brackets 47 and 48, with suitable means of conventional form, not shown, being provided for energizing the lamp 11. It is important that the lower end portion of the lamp 11 extends downwardly well into the converging mouth structure. Insects have a natural habit of flying in a circular motion within about forty-five degrees of a vertical plane toward the bottom of a light source such as provided. Thus the insects are attracted deeply within the mouth where the air velocity approaches its peak value, and the efficiency of the trap is thereby increased.

It should be noted that the center of gravity of the vane 42 is spaced rearwardly from the axis of pivotal movement, to urge the vane to the position as illustrated in full lines. Means other than gravity could, of course, be utilized for urging the vane to the illustrated position.

It will be understood that other modifications and variations may be effected without departing from the spirit and scope of the novel concepts of this invention.

I claim as my invention:

1. In an insect trap, a substantially vertical air passage means having an inlet and an outlet defining a downwardly moving air flow, an air circulating blower in said air passage means for effecting the air flow from said inlet to said outlet, an ultraviolet lamp adjacent said air flow and between said outlet and said inlet for attracting insects thereto, and insect collection means communicating with said air passage means between said inlet and said blower to receive insects.

2. In an insect trap as defined in claim 1, said inlet and said outlet being in generally vertically spaced relation to create an air curtain adjacent said lamp flowing toward said collection means.

3. In an insect trap as defined in claim 2, said lamp being an elongated fluorescent tube disposed with its longitudinal axis in parallel relation to the direction of air flow in said curtain.

4. In an insect trap as defined in claim 3, said air passage means including a conduit having a generally straight portion extending from said blower in parallel relation to said lamp and in parallel relation to said air curtain, and a generally inverted U-shaped portion extending from said straight portion to said outlet.

5. In an insect trap as defined in claim 1, said air passage means being arranged to cause air flow from said inlet toward said collection means and then back in a generally reverse direction to said blower.

6. In an insect trap as defined in claim 1, said collection means comprising container means with a closed lower end and an open upper end, and said air passage means comprising a generally vertical conduit portion extending upwardly from said upper end of said container means to said inlet.

7. In an insect trap as defined in claim 6, flared wall means at the upper end of said conduit portion to define a mouth converging from said inlet to a throat of reduced cross-sectional area.

8. In an insect trap as defined in claim 7, said lamp being an elongated fluorescent tube extending generally vertically with its lower end extending down into said mouth.

9. In an insect trap as defined in claim 6, said conduit portion having an opening in a side wall thereof and means supporting said blower on said side wall with an intake thereof at said side wall opening.

10. In an insect trap as defined in claim 5, pivotal vane means within said conduit portion urged to a closed position to prevent escape of insects and movable to an open position by air flow induced by said blower.

References Cited

UNITED STATES PATENTS

| | | | |
|---|---|---|---|
| 1,463,583 | 7/1923 | Holleran | 15—320 |
| 1,819,551 | 8/1931 | Gourdon | 43—139 |
| 2,013,969 | 9/1935 | Menasche | 43—139 |
| 2,569,722 | 10/1951 | Knox | 43—139 |
| 2,893,161 | 7/1959 | Reid | 43—139 |
| 3,058,257 | 10/1962 | Brophy et al. | 43—139 |
| 3,196,577 | 7/1965 | Plunkett | 43—139 |

ALDRICH F. MEDBERY, *Primary Examiner.*